United States Patent [19]

Shinno et al.

[11] Patent Number: 4,997,510
[45] Date of Patent: Mar. 5, 1991

[54] AUTOMATIC TAPE AFFIXING APPARATUS

[75] Inventors: Nobuo Shinno; Yasuhiro Ohnishi; Toshikazu Shigematsu, all of Osaka, Japan

[73] Assignee: Shinnippon Koki Kabushiki Kaisha (Shinnippon Koki Co., Ltd.), Osaka, Japan

[21] Appl. No.: 327,924

[22] Filed: Mar. 23, 1989

[30] Foreign Application Priority Data

Mar. 28, 1988 [JP] Japan .................................. 63-75632

[51] Int. Cl.$^5$ .............................................. B32B 31/00
[52] U.S. Cl. .................................. 156/361; 156/523; 156/574
[58] Field of Search .......................... 156/574, 361, 523

[56] References Cited

U.S. PATENT DOCUMENTS 4,627,886 12/1986 Grone et al. .......................... 156/361
4,750,965 6/1988 Pippel et al. ..................... 156/574 X

*Primary Examiner*—David A. Simmons
*Attorney, Agent, or Firm*—Jordan and Hamburg

[57] ABSTRACT

An automatic tape affixing apparatus including a tape affixing head movable in X-axis, Y-axis, Z-axis, A-axis and C-axis directions, a tape presser roller attached to the tape affixing head by a roller carrying member, the tape presser roller including a plurality of roller members disposed in a widthwise direction, the roller members being rotatably supported by a holding shaft held by the roller carrying member and being movable with respect to an adhesion form independently of one another, a guide mechanism for pivoting the tape affixing head along an arc locus the center of which is the tape presser roller and which is around an A axis, a displacement sensor for detecting the variation of distance between roller members in the opposite end portions of the tape presser roller and the roller carrying member, and control means for receiving a detection signal from the displacement sensor and pivoting the tape affixing head along the guide mechanism so as to make the distance in one end portion identical with the distance in the other end portion.

11 Claims, 10 Drawing Sheets

AUTOMATIC TAPE AFFIXING APPARATUS

BACKGROUND OF THE INVENTION AND RELATED ART STATEMENT

The present invention relates to an apparatus for automatically affixing a tape of composite material onto the surface of an adhesion form having various contours to make a lamination of the tape.

In recent years, lightweight plate materials have been produced from a tape of composite material, i.e. a tape prepared by impregnating carbon fiber, aramid fiber or like reinforcing fiber with a thermosetting resin, by affixing the tape on the surface of an adhesion form (body) having specified contours to make a lamination, and thereafter subjecting the lamination to a curing treatment with application of heat and pressure. U.S. Pat. No. 4461,669, for example, discloses an apparatus for automatically affixing a tape of composite material. According to this disclosure, a tape is continuously fed from a reel and pressed against the surface (curved surface) of the adhesion form with a presser roller, the presser roller is moved along a predetermined path to successively affix the tape strips without leaving a clearance therebetween. The tape strips are affixed one layer over another layer in different directions from one another. The presser roller is pivoted by an affixing head so that the presser roller can come in contact with sloping surfaces of the adhesion form.

With respect to a surface sloping in a widthwise direction of the tape, the above-mentioned apparatus enables the presser roller to incline so as to entirely come into contact with the surface. However, the conventional apparatus can not render the presser roller come in completely contact with a surface having an irregularity within a width of the presser roller. Further, the conventional apparatus allows presser roller to utilize a partial reaction force from the sloping surface so that a portion holding the presser roller may be given an inclining force in accordance with the partial reaction force. Accordingly, it could be seen that the presser roller can not follow the sloping surface at a high responsiveness. Also, the presser roller which always receives partial reaction forces can not press the tape at a uniform pressure and can not then attain complete affixing of tape.

The present invention has worked out to overcome the above mentioned drawbacks. It is an object of the present invention to provide an automatic tape affixing apparatus capable of pressing a tape upon a variety of curved surfaces in good contact and further capable of affixing the tape at a uniform pressure.

SUMMARY OF THE INVENTION

An apparatus according to the present invention comprises a tape affixing head movable in X-axis, Y-axis, Z-axis, A-axis and C-axis directions, a tape presser roller attached to the tape affixing head by a roller carrying member, the tape presser roller including a plurality of roller members disposed in a widthwise direction, the roller members being rotatably supported by a holding shaft held by the roller carrying member, and being movable with respect to an adhesion form independently of one another, a guide mechanism for pivoting the tape affixing head along an arc locus the center of which is the tape presser roller and which is around the A axis, a displacement sensor for detecting the variation of distance between roller members in the opposite end portions of the tape presser roller and the roller carrying member, and control means for receiving a detection signal from the displacement sensor and pivoting the tape affixing head along the guide mechanism so as to make the distance in one end portion identical with the distance in the other end portion.

Accordingly, with respect to a sloping surface of an adhesion form, the inclination of the sloping surface is found out by sensors for detecting the displacement variation of roller members to calculate correction amount. Then, the tape affixing head is pivoted in accordance with the calculated correction amount so that the presser roller inclines about a center thereof. Also, with respect to an irregularity within the width of the presser roller, the roller members can be vertically moved independently of one another. Consequently, it could be seen that the presser roller is able to press a tape across the whole width.

DETAILED DESCRIPTION OF PREFERRED EMBODIMENTS

Figure 2:
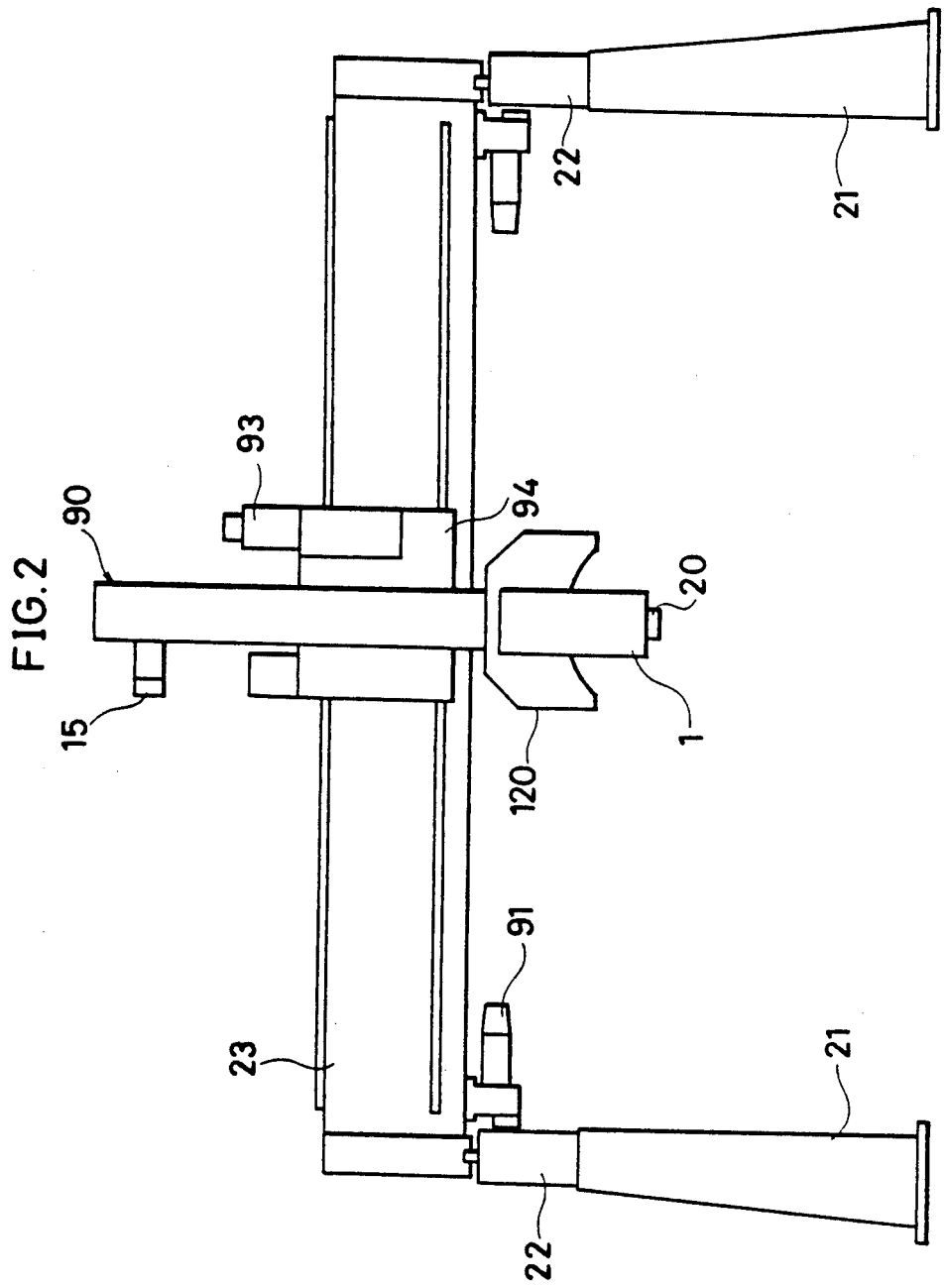
FIG. 2 is an overall schematic front view showing an apparatus embodying the invention.
Figure 3:
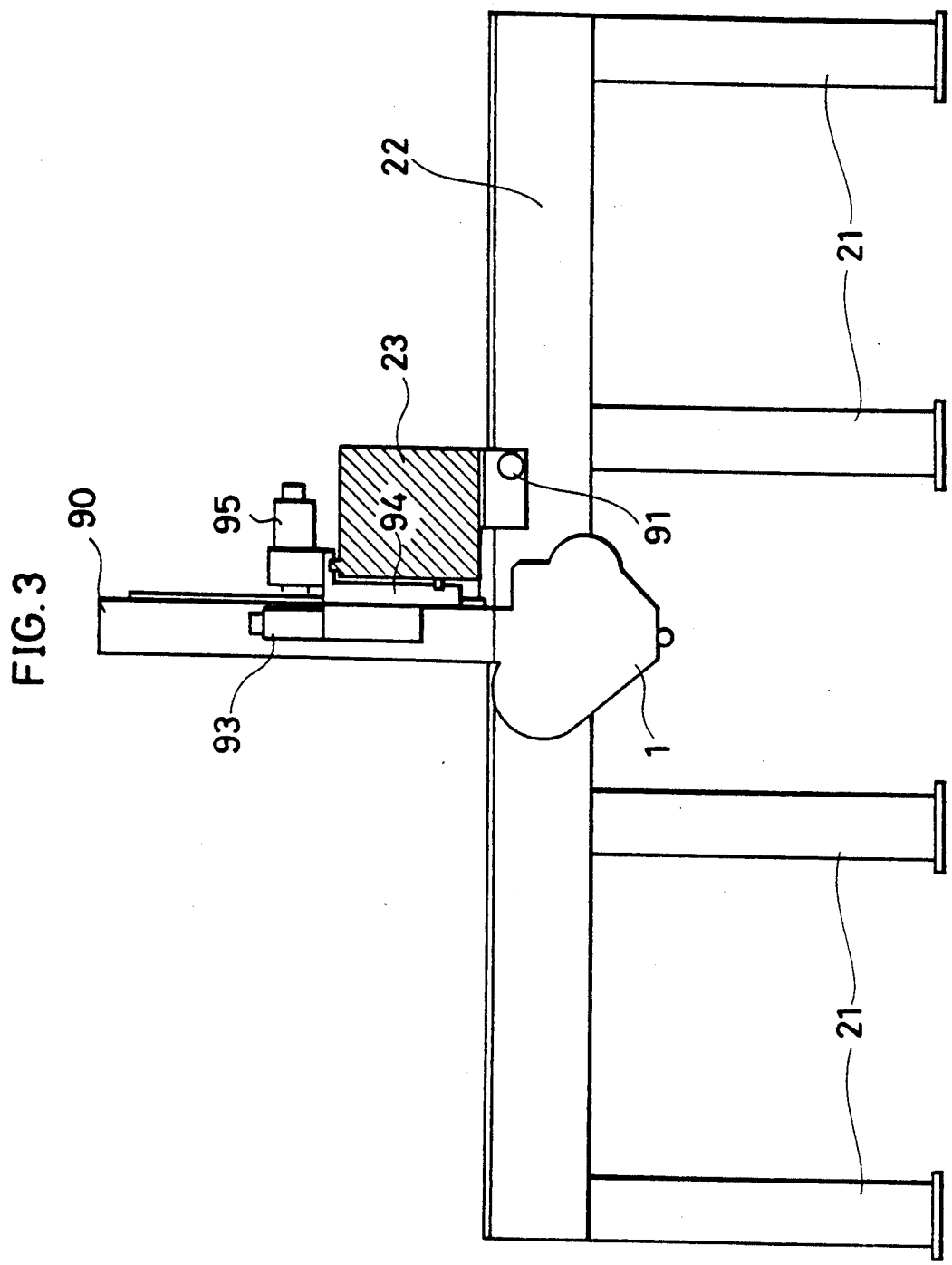
FIG. 3 is a side view showing the apparatus.

With reference to FIGS. 2 and 3, a pair of side rails 22 supported by columns 21 are arranged in parallel to each other. A cross rail 23 extends between and is supported by the side rails 22. The cross rail 23 is movable on the side rails 22 by an X-axis servomotor 91 in the direction of X axis (perpendicular to the plane of FIG. 2). A Y-axis saddle 94 mounted on the cross rail 23 is movable by a Y-axis servomotor 93 along the cross rail 23 in the direction of Y-axis (laterally in FIG. 2). A Z-axis saddle 90 mounted on the Y-axis saddle 94 is movable by a Z-axis servomotor 95 in the direction of Z axis (vertically).

A head saddle 120 is attached to a lower portion of the Z-axis saddle 90 with rotatable about C axis (an axis for rotation about Z axis). The head saddle 120 is driven by a C-axis servomotor 15. A tape affixing head 1 is also carried with rotatable about A axis (an axis for rotation about X axis) by a mechanism described below.

Figure 4:
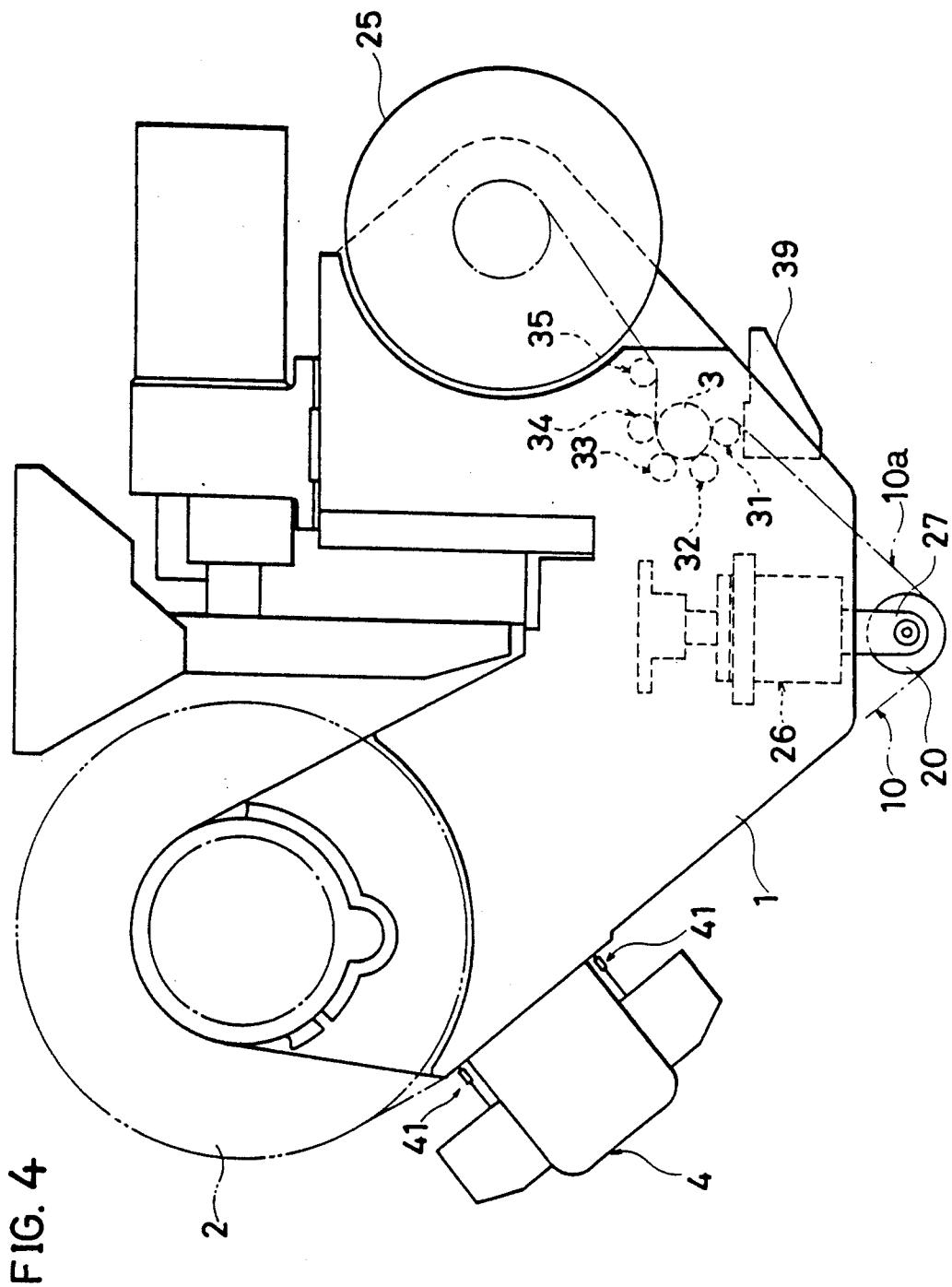
FIG. 4 is a side view showing the tape affixing head.

As shown in FIG. 4, the tape affixing head 1 is provided with a tape supply reel 2 and a take-up reel 25. The tape supply reel 2 carries a roll 10 of double layer tape consisting of composite tape and backing paper and the take-up reel 25 winds up only the backing paper 10a.

The tape 10 paid off from the reel 2 is cut at a predetermined length by cutters 41 of a tape cutting device 4 with the backing paper being not cut. In other words, composite tape only is cut. Cut-off strips of the composite tape are then pressed on an adhesion form by a presser roller 20, and the backing paper 10a is run around a drive roller (pinch roller) 3 and then wound on the take-up reel 25. Reference numeral 39 designates a scrap tape collection box.

The presser roller 20 is held by a bracket 27 of a roller carrying member (holding means) 26 attached to the tape affixing head. A plurality of driven rollers 31, 32, 33 and 34 are disposed around the drive roller 3, each of which presses the tape 10 against the peripheral surface of the drive roller 3. An auxiliary roller 35 defines the taking-up direction of the tape 10 from the drive roller 3.

Figure 1:
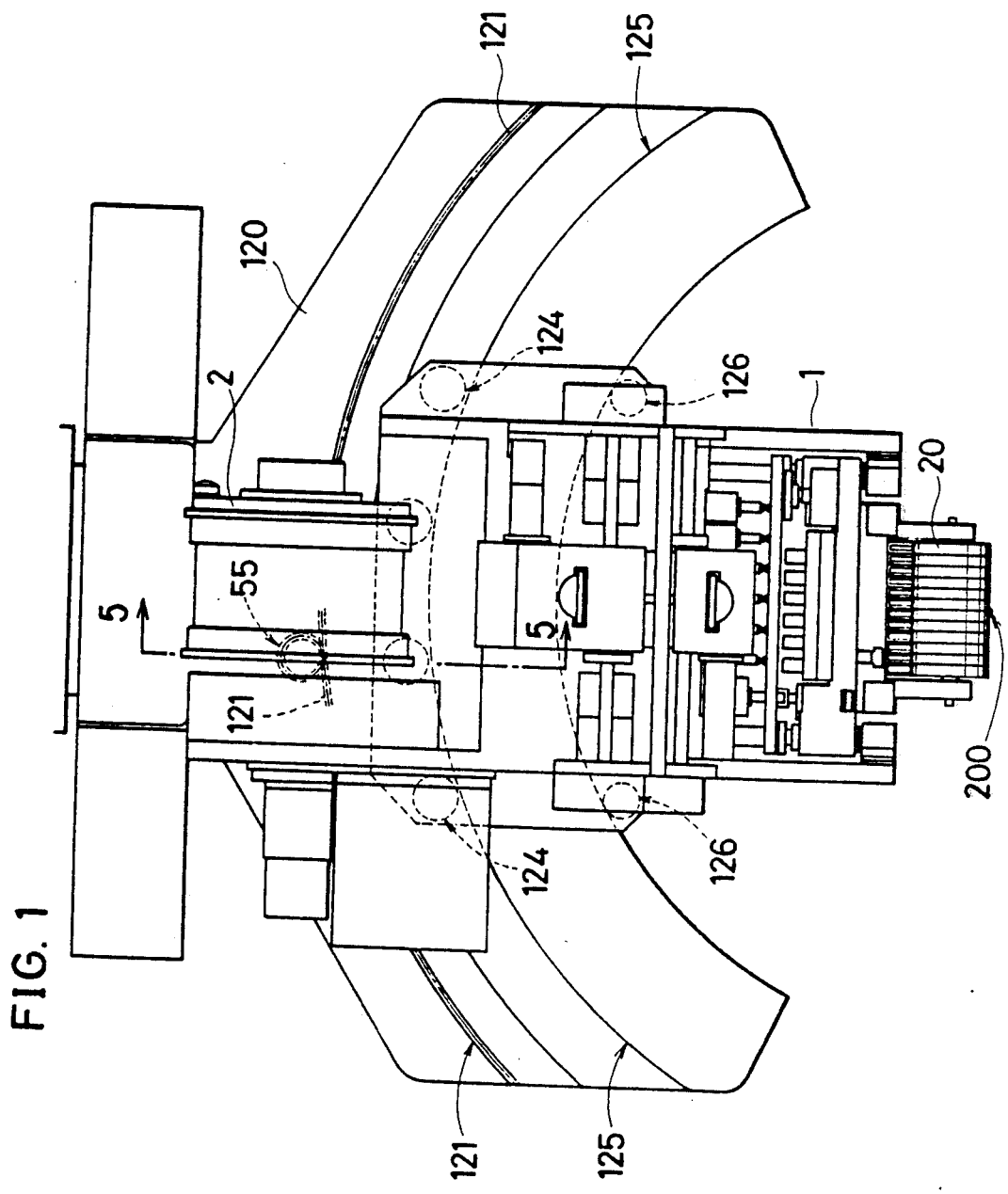
FIG. 1 is a schematic front view showing a mechanism for pivoting a tape affixing head of an embodiment according to the present invention.
Figure 5:
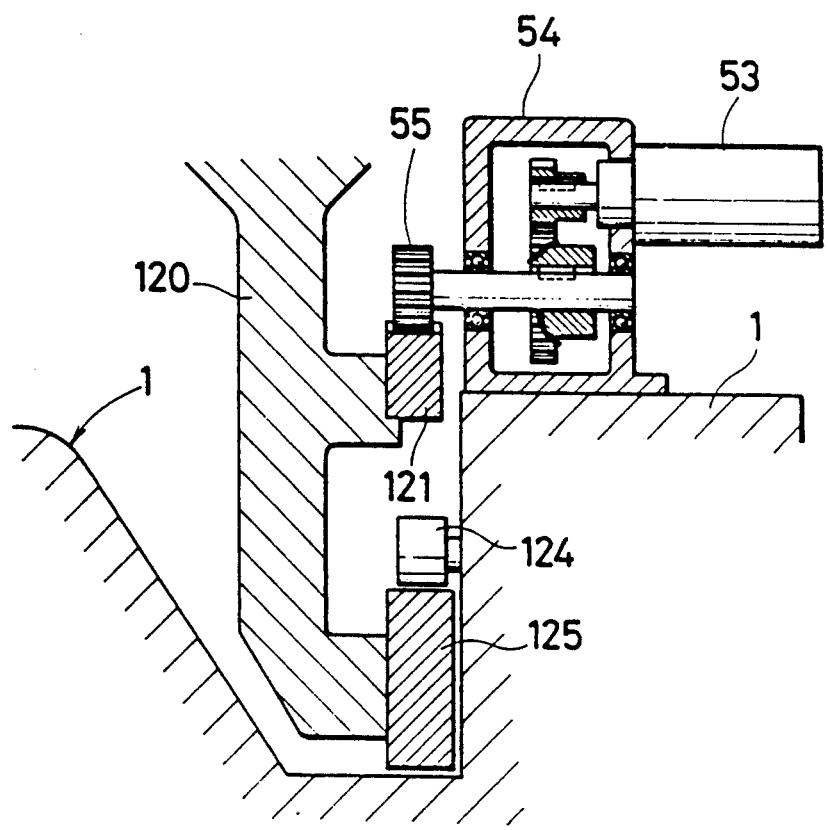
FIG. 5 is a sectional view along the line V—V in FIG. 1.

FIGS. 1 and 5 show a mechanism for pivoting the tape affixing head 1. The head saddle 120 is formed with an A-axis rack 121 and an A-axis slide way 125. Both the A-axis rack 121 and A-axis slide way 125 are formed on an arc locus of which center coincides with a lowermost center (pivotal center) 200 of the presser roller 20. The tape affixing head 1 is provided with guide rollers 124, 126 and a drive gear 55 driven by an A-axis servomotor 53 through a reduction device 54. The drive gear 55 comes in mesh with the A-axis rack 121 to drive the tape affixing head 1.

The guide rollers 124 and 126 are made in contact with the outer surface and inner surface of the A-axis slide way 125 so that the A-axis slide way 125 is held between them. Further, guide rollers not shown are made in contact with the front surface and rear surface of the A-axis slide way 125 so that the A-axis slide way 125 is held between them. Consequently, the tape affixing head 1 can be stabilizedly moved along the A-axis slide way 125.

Figure 6:
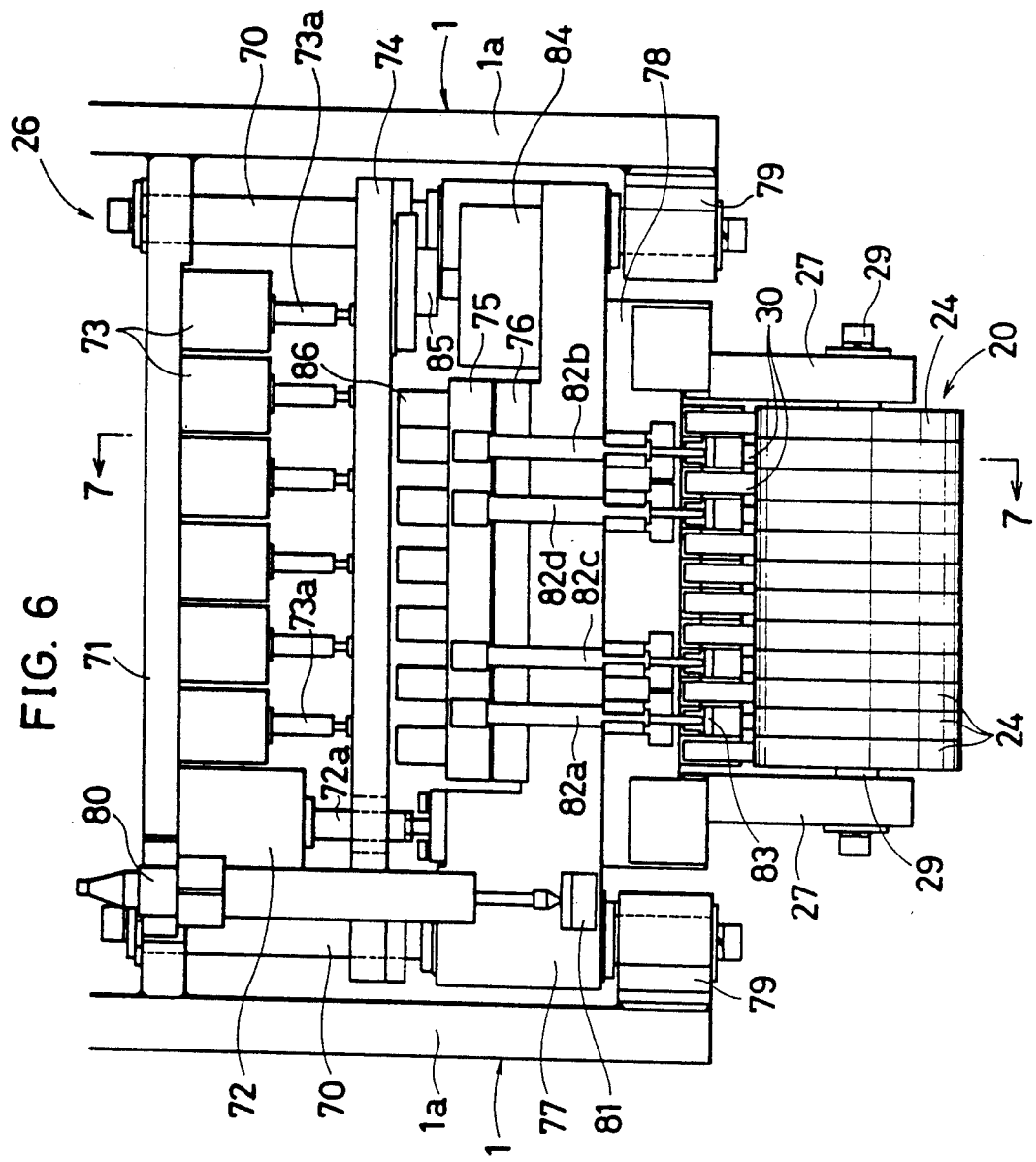
FIG. 6 is a front view showing a presser roller and a mechanism for holding the presser roller.
Figure 7:
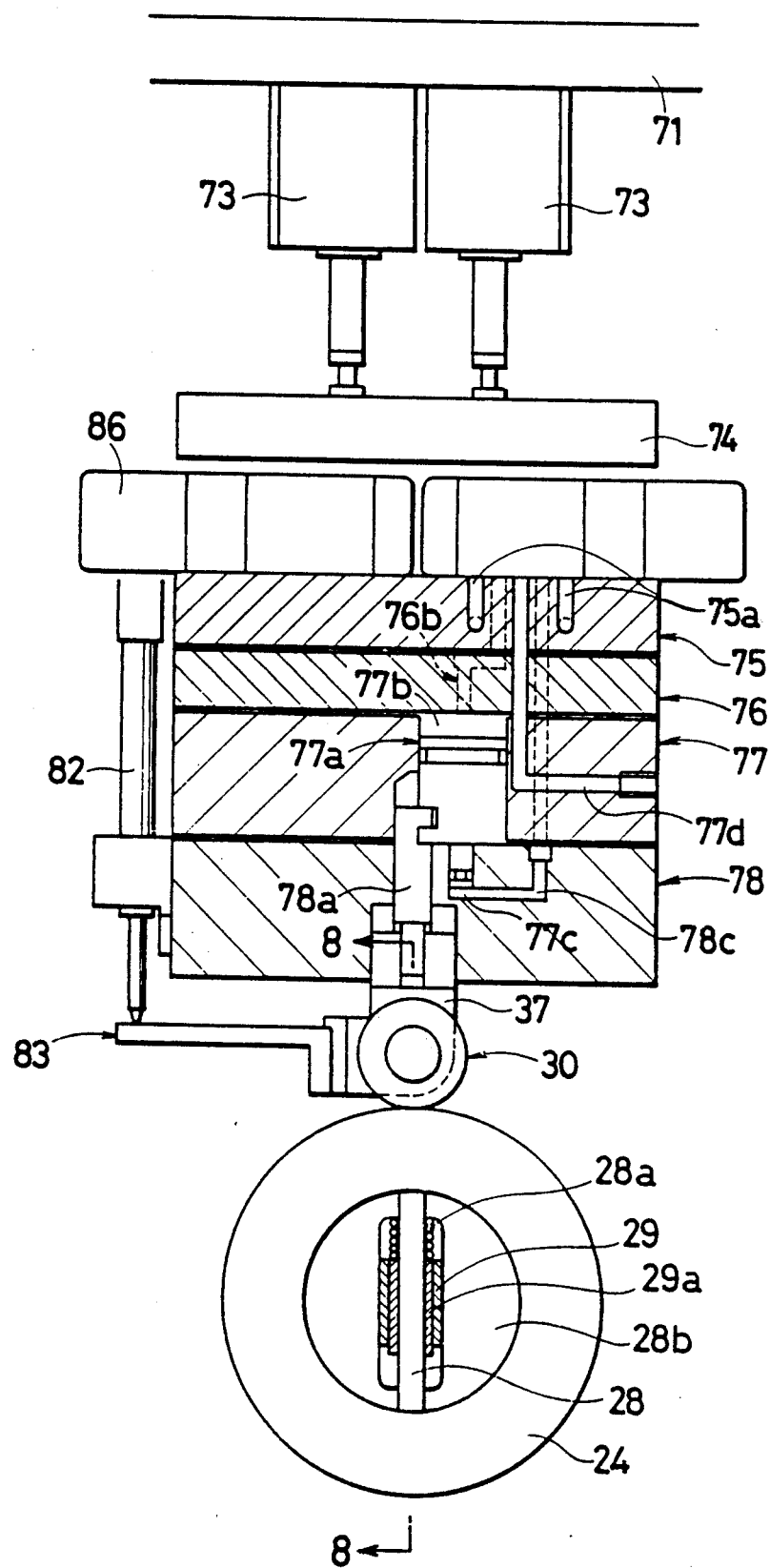
FIG. 7 is a sectional view along the line VII—VII in FIG. 6.
Figure 8:
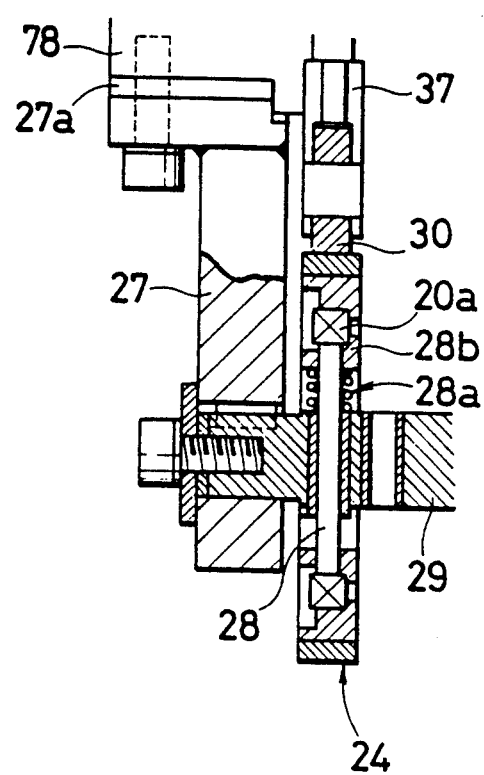
FIG. 8 is a sectional view along the line VIII—VIII in FIG. 7.

FIGS. 6 to 8 show a structure of the roller carrying member 26 of the tape affixing head 1. The tape affixing head 1 has a pair of opposite side plates 1a. The roller carrying member 26 is disposed between them. The roller carrying member 26 has a holding plate 71 bridged between upper portions of the side plates 1a and brackets 79 mounted on respective lower portions of the same. The holding plate 71 and the brackets 79 hold guide bars 70.

Further, a plurality of pressurizing cylinders 73 and weight canceling cylinders 72 are attached on the underside of the holding plate 71. Although the drawing shows only the pressurizing cylinders 73 and weight canceling cylinder 72 provided in the front portion, the same components are symmetrically provided in the rear portion. The lower ends of piston rods 73a of the pressurizing cylinders 73 are pressed against a pressure plate 74. The pressure plate 74 is slidable vertically along the guide bars 70 extending through the opposite end portions thereof. Under the pressure plate 74 is disposed a block 77 which is connected to a piston rods 72a of the weight canceling cylinders 72. The block 77 is slidable vertically along the guide bars 70 extending through the opposite end portions thereof.

On the block 77 are placed other blocks 76 and 75 on which solenoid operated valves 86 are placed. On the opposite side portions of the block 77 are placed load cells 84. Load cell seats 85 are attached on the underside of the pressure plate 74 so as to face the load cells 84. Drawings shows only the load cell placed on one side. Another load cell is symmetrically provided on the other side of the block 77. Consequently, the load from the pressure plate 74 is transmitted to the block 77 via the load cells 84.

To the underside of the block 77, another block 78 is attached. Brackets 27 for carrying the presser roller 20 are attached to the block 78 by spacers 27a. The presser roller 20 consists of a plurality of roller members 24 disposed widthwise. A shaft 29 for supporting the roller members 24 has the opposite ends unrotatably attached to the brackets 27. In each roller member supporting portion, a guide 29a is fixedly attached to the supporting shaft 29. A guide bar 28 is vertically movably passed through the guide 29a. The opposite (upper and lower) ends of the guide bar 28 are fixedly attached to inner roller member 28b. The roller members 24 is rotatably mounted on the outer circumference of the inner roller member 28b with a bearing 20a. A spring 28a is provided between the inner roller member 28b and the supporting shaft 29 so as to apply an upward force to the roller member 24.

A bearing 30 is pressed on the top portion of the roller member 24. A member 37 of holding the bearing 30 is connected to an actuating member 78a which is slidably mounted in the block 78. A piston member 77a is further connected to an upper portion of the actuating member 78a. The piston member 77a is placed in a cylinder chamber of the block 77. An upper chamber 77b and a lower chamber 77c are respectively communicated with passages 76b and 78c which are formed in the blocks 75 to 78. The passages 76b, 78c are switchablely communicated with a passage 77d connecting to a fluid source not shown and a drainage passage 75d by the solenoid operated valve 86.

A sensor 80 is mounted on the above mentioned holding plate 71. The vertical position of the block 77 relative to the tape affixing head 1 is measured by contact of the tip of the sensor 80 with a gauge block 81 mounted on the block 77.

Furthermore, a gauge block 83 is attached to the holding member 37 with projecting in a lateral direction. The forward end portion of the gauge block 83 comes into contact with the tip of a sensor 82 mounted on the block 78, so that the vertical position of the bearing 30, or the vertical position of the roller member 24 is measured.

The sensor 82, as shown in FIG. 6, comprises a pair of sensors 82a, 82b corresponding to the opposite end roller members 24 and a pair of sensors 82c, 82d corresponding to roller members inner than the opposite end roller members. It should be noted that in accordance with the width of used tape, the outer pair of sensors 82a, 82b or the inner pair of sensors 82c, 82d are alternatively used so as to measure the vertical position of the roller member pressing on the opposite side portions of the tape.

Figure 9:
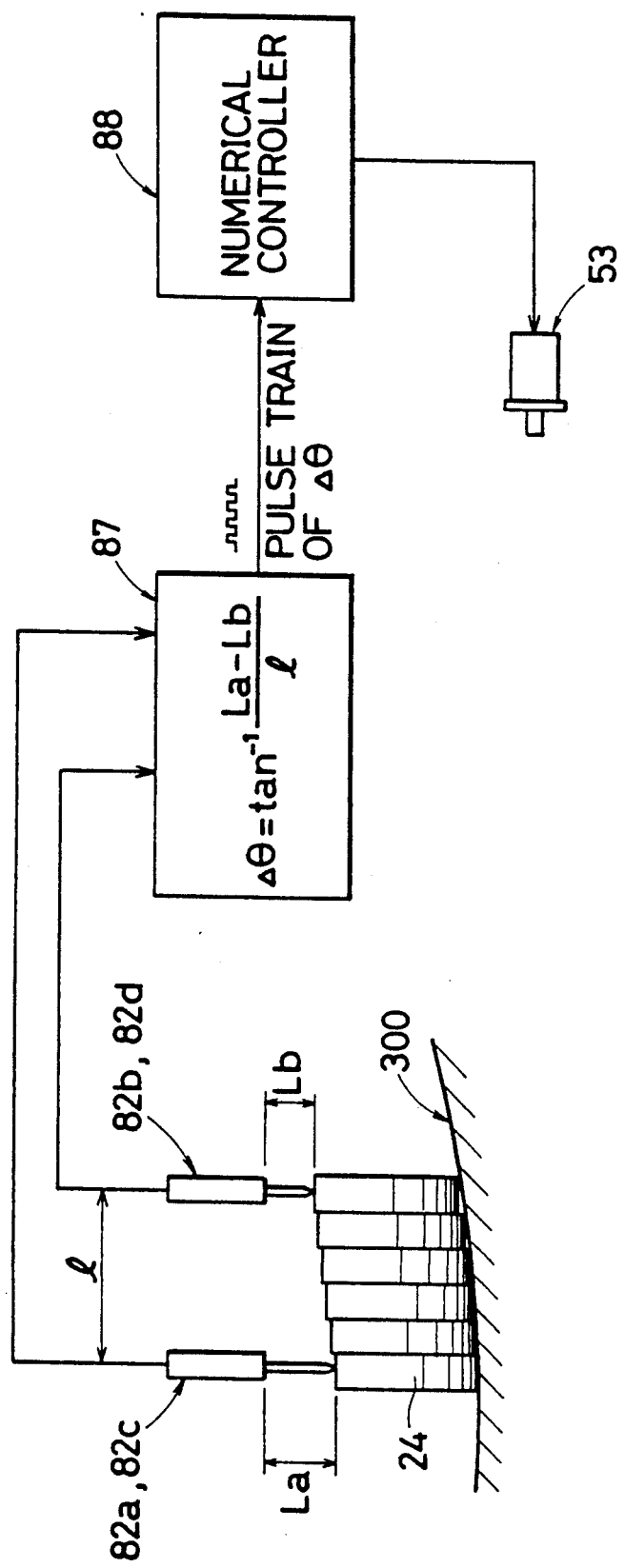
FIG. 9 is a diagram showing control of inclination angle adjustment of the presser roller.
Figure 10:
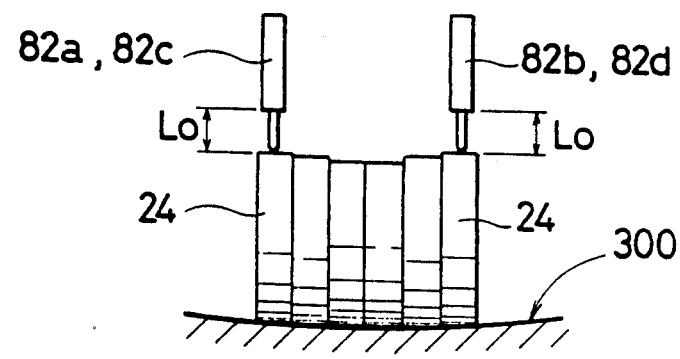
FIG. 10 is a diagram showing a state that the presser roller is pressed against an adhesion form.

With those sensors 82a, 82b or 82c, 82d, vertical distances La, Lb of the roller members at the opposite end portions is measured as shown in FIG. 9. Measurement signals are put in a microcomputer 87. The computer 87 calculates a control angle, that is, an angle $\theta$ of pivoting movement whose center coincides with the lowermost center 200 of the tape affixing head 1 in accordance with the following equation:

$$\Delta\theta = \tan^{-1}(La - Lb)/L$$

wherein L is a distance between the opposite sensors.

A pulse corresponding to the above Δθ is transmitted from the microcomputer 87 to a numerical controller 88 to drive the A-axis servomotor 53.

An operation of the embodiment according to the invention will now be described. The block 77 carries the blocks 75, 76 and 78, the load cells 84, the pressure plate 71, the solenoid operated valves 86, the presser roller 20 and the like. The block 77 is pulled up by the weight canceling cylinder 72 through the piston rod so that the weights of the above members are not applied to an adhesion form. In this state, the pressurizing cylinders 73 exert a pressurizing force on the block 77 through the pressure plate 74 and the load cells 84.

On the other hand, pressurized fluid is supplied from the passage 77d via the solenoid operated valves 86 to the upper chamber 77b so that a predetermined downward force is applied to the bearing 30 through the piston member 77a, the actuating member 78a and the bearing holding member 37 to press down the roller member 24 of the presser roller 20.

The sum of pressing forces applied to the roller members 24 by the bearings 30 is made to be larger than the sum of pressurizing forces produced by the pressurizing cylinders 73. Accordingly, the sum of the pressurizing forces produced by pressurizing cylinders 73 is applied to the adhesion form as tape pressing force. Further, even when the tape is affixed on a curved surface of the adhesion form, a uniform force can be applied to the tape across the whole width following the surface of the adhesion form as shown in FIG. 6 because the roller members 24 are vertically moved independently of one another within a range of vertical stroke of the piston 77a.

Then, X-axis, Y-axis and Z-axis servomotors 91, 93 and 95 are actuated to press the presser roller 20 at the forward end of the tape affixing head 1 against the adhesion form and to move the tape affixing head 1 along a programmed path on the surface 300 of the adhesion form while the tape 10 is fed from the supply reel 2 at a predetermined rate and tension, whereby the tape is affixed on the surface 300.

It could be seen that the surface 300 of the adhesion form is in a plane perpendicular to the Z axis (vertical axis) of the tape affixing head 1, the roller members 24 entirely come into contact with the surface and uniform pressure are consequently applied to the tape 10. However, when the surface 300 of the adhesion form is in an inclined plane having a curvature as shown in FIG. 9, the roller members 24 come into contact with the surface 300 with respective roller members inclining with respect to the surface.

A peripheral portion of the roller member 24 is made of elastic material such as urethane rubber so that it can deform in accordance with surfaces of the adhesion form. However, such deformation has a limit. In the case that the roller members 24 come into contact with the surface with respective roller members inclining with respect to the surface, the presser roller 20 can not satisfactorily press the tape 10 across its whole width.

Figure 11:
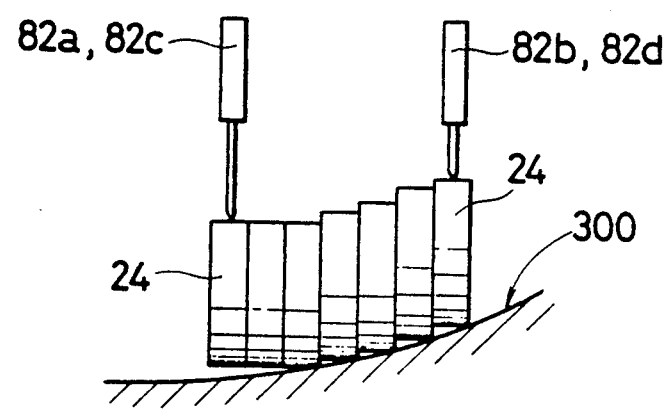
FIG. 11 is a diagram showing a conventional pressing state.

In the case that the sloping surface of the adhesion form has a greater inclination as shown in FIG. 11, there are some of the roller member 24 which can not come in contact with the surface 300 of the adhesion form since roller member 24 has a limit in its vertical stroke as mentioned above. This results in inappropriate pressing in which only a part of the width of the tape is pressed and the tape is not perfectly affixed. Further, in such inappropriate pressing, the tape receives a lateral force and is then liable to deviate in a widthwise or lateral direction. It is necessary that tape strips are affixed with a minute clearance between the tape strips by a preprogrammed movement of the tape affixing head 1. To attain such affixing, it is essential that no widthwise deviation arises. If the tape is deviated widthwise by the pressing rollers, strips of the tape 10 are affixed with large clearances therebetween, or conversely the strips are overlapped. Accordingly, a plate material which is obtained by laminating tape strips in the above mentioned way and thereafter subjecting to curing treatment does not have a specified quality in strength or the like.

In such inappropriate press contact as stated above, distances La, Lb of the opposite end roller members 24 are different. The distances are measured by the sensors 82a, 82b or sensors 82c, 82d. The microcomputer 87 calculates an inclination angle Δθ in accordance with the equation shown above. Then, the microcomputer 87 actuates the A-axis servomoter 53 through the numerical controller 88, so that the tape affixing head 1 pivotally moves along the A-axis slide way 125 shown in FIGS. 1 and 5. As a result, distances of the opposite end roller members 24 come to the same distance of Lo, and all the roller members 24 are perpendicular to the surface 300. Consequently, the whole width of the tape 10 is pressed by the roller members 24. Furthermore, the presser roller 20 inclines about its lowermost center 200. Therefore, there is no likelihood that the tape 10 deviates widthwise.

As described above, by controlling the inclination angle of A-axis in accordance with varied surfaces of the adhesion form, the presser roller can be always perpendicularly pressed to the adhesion form.

In the case that tape is affixed to an adhesion form having a complicated surface configuration to make a lamination, movement of a tape affixing head is programmed in advance with respect to X, Y, Z, A and C axes by finding out a path on which the tape is to be affixed from drawing data about the configuration of the adhesion form and the X-axis, Y-axis, Z-axis, A-axis and C-axis servomotors 91, 93, 95, 53 and 15 being actuated so that the presser roller 20 at the forward end of the tape affixing head 1 renders the tape to the tape to affix on the adhesion form, there is a likelihood that the presser roller is not pressed perpendicularly to the adhesion form even when the tape-affixing head is moved in accordance with a programmed path. This is because an actual configuration of the adhesion form is different from the configuration of the drawing data due to manufacturing errors. However, by indirectly detecting the configuration of the adhesion form by a sensor while affixing the tape in the same control manner as stated above, the presser roller can be always made in perpendicular contact with the adhesion form.

Also, in the case that the inclination of the surface 300 is found out by directly detecting the surface 300 with a sensor, when an inclination at the detection position is different from that at the contact positions of roller members, inappropriate correction is carried out. However, in the case that the inclination is found out by detecting vertical positions of roller members 24 as described above, accurate detection and correction can be performed, the likelihood is consequently eliminated that irregular forces are applied over the presser roller 20.

As mentioned above, an apparatus of the present invention in which a tape affixing head is pivotable about an A-axis corresponding to an inclined surface of the adhesion form so that a presser roller inclines at a lowermost center thereof, and roller members of the presser roller vertically movable independently of one another to press the tape across its whole width makes it possible to entirely affix the tape with applying pressure across its whole width. Additionally, since the presser roller is inclined in accordance with vertical positional changes of the opposite end roller members, uniform pressing force can be applied to the tape, and the presser roller can be controlled with an increased responsiveness.

What is claimed is:

1. An automatic tape affixing apparatus comprising:
   a tape affixing head movable along a plurality of axes and operable to apply a material onto an affixing surface;
   a tape presser roller means carried by said tape affixing head, said tape presser roller means comprising a roller carrier means carrying a roller shaft and a plurality of rotatable roller member means rotatably carried by said roller shaft;
   said tape affixing head having an operable axis which passes through said lowermost center of said tape presser roller means and through the axis of said roller shaft;
   guide mechanism means for pivoting said tape affixing head about a pivotal axis which is disposed at the lowermost center of said tape presser roller means;
   operable means on said tape presser roller means for independently supporting and moving each of said rotatable roller member means relative to said roller carrier means, said operable means comprising a cylinder means with a piston operable in said cylinder means, and an actuating means operably disposed between said piston and said rotatable roller member means, said piston being movable in said cylinder means to effect movement of said rotatable roller member means, said piston means being movable along an axis which is maintained parallel to said operable axis, said actuating means comprising an actuating member rotatably supporting a bearing means which is operably engageable with the outer periphery of said rotatable roller member means, and gauge block means carried by said actuating member, said actuating member and said gauge block means being movable along a linear path which is maintained parallel to said operable axis;
   a plurality of displacement sensor means for detecting the distance between separate rotatable roller member means and said roller carrier means, said displacement sensor means having a movable member which moves linearly parallel to said operable axis to detect said distance, said gauge block means being engageable with said movable member of said displacement sensor means; and
   control means receiving detecting signals from said displacement sensor means and utilizing said detecting signals to control said guide mechanism means to pivot said tape affixing head about said pivotal axis to thereby adapt said tape pressure roller means to the orientation of said affixing surface.

2. An automatic tape affixing apparatus according to claim 1, wherein said tape affixing head comprises support means having guide bars which are maintained parallel to said operable axis, and block means slidably mounted on said guide bars, said cylinder means being disposed on said block means.

3. An automatic tape affixing apparatus according to claim 2, wherein said operable means further comprises solenoid means on said block means and operable to control operation of the pistons within said cylinder means.

4. An automatic tape affixing apparatus according to claim 2, wherein said support means comprises a holding plate fixed to said guide bars and a pressure plate slidable on said guide bars, and pressurizing cylinder means operably connected between said holding plate and said pressure plate.

5. An automatic tape affixing apparatus according to claim 4, wherein said tape affixing head further comprises weight cancelling cylinder means operably disposed between said holding plate and said block means.

6. An automatic tape affixing apparatus according to claim 2, wherein said tape affixing head further comprises load cell means operably disposed between said pressure plate and said block means.

7. An automatic tape affixing apparatus according to claim 6, wherein said tape affixing head further comprises a second displacement sensor means mounted on said support means and having a movable elongate member operably engageable with said block means for detecting the distance between said block means and said support means, said elongate member being movable linearly to detect the last said distance.

8. An automatic tape affixing apparatus according to claim 7, wherein said elongate member is movable along a linear axis which is parallel to said operable axis.

9. An automatic tape affixing apparatus comprising:
   a tape affixing head movable along a plurality of axes and operable to apply a material onto an affixing surface;
   a tape presser roller means carried by said tape affixing head, said tape presser roller means comprising a roller carrier means carrying a roller shaft and a plurality of rotatable roller member means rotatbly carried by said roller shaft;
   said tape presser roller means having an operable axis which passes through the lowermost center of said tape presser roller means and through the axis of said roller shaft;
   guide mechanism means for pivoting said tape affixing head about a pivotal axis which is disposed at the lowermost center of said tape presser roller means;
   operable means on said tape presser roller means for independently supporting and moving each of said rotatable roller member means relative to said roller carrier means, said operable means comprising an actuator means rotatably carrying a bearing means, said bearing means being in operable contact with the outer periphery of said rotatable roller member means, said actuator means being movable along a linear path which is maintained parallel to said operable axis;
   a plurality of displacement sensor means for detecting the distance between separate rotatable roller member means and said roller carrier means, said displacement sensor means having a movable member which engages said actuator means and which moves linearly parallel to said operable axis to detect said distance; and control means receiving detecting signals from said displacement sensor means and utilizing said detecting signals to control said guide mechanism means to pivot said tape affixing head about said pivotal axis to thereby adapt said tape pressure roller means to the orientation of said affixing surface, said control means being operable to cause said guide mechanism means to pivot said tape affixing head about said pivotal axis to thereby maintain said operable axis generally perpendicular to said affixing surface.

10. An automatic tape affixing apparatus according to claim 9, wherein said guide mechanism means comprises a mounting means for mounting said tape affixing head for pivotal movement about said pivotal axis.

11. An automatic tape affixing apparatus according to claim 9, wherein said operable axis is disposed vertically when said affixing surface is horizontally disposed, said operable axis being disposed at an acute angle relative to vertical when said affixing surface is disposed at an acute angle relative to horizontal.

* * * * *